United States Patent [19]

Plancon

[11] 4,336,471
[45] Jun. 22, 1982

[54] STATOR ASSEMBLY FOR STEPPING MOTOR

[75] Inventor: Michel G. Plancon, Besancon, France

[73] Assignee: Timex Corporation, Waterbury, Conn.

[21] Appl. No.: 200,229

[22] Filed: Oct. 24, 1980

[51] Int. Cl.³ .......................................... H02K 37/00
[52] U.S. Cl. .................................. 310/49 R; 310/162; 310/268
[58] Field of Search ............... 310/49 R, 266, 268, 310/43, 162, 164, 40 MM; 368/157, 160

[56] References Cited

U.S. PATENT DOCUMENTS

| | | | |
|---|---|---|---|
| 2,548,133 | 4/1951 | Treat | 310/43 |
| 3,475,630 | 10/1969 | Heinzen et al. | 310/268 |
| 3,989,967 | 11/1976 | Kikuyama et al. | 310/49 R |
| 4,075,518 | 2/1978 | Koehler et al. | 310/49 R |
| 4,079,279 | 3/1978 | Oudet et al. | 310/268 |
| 4,217,509 | 8/1980 | Sudler | 310/49 R |

*Primary Examiner*—J. D. Miller
*Assistant Examiner*—D. L. Rebsch
*Attorney, Agent, or Firm*—William C. Crutcher; Edward J. Timmer

[57] ABSTRACT

The efficiency of a stepping motor is increased by using a stator assembly comprising (a) a magnetically permeable first stator member having a central hub and multiple, spoke-like pole pieces radiating from the hub and (b) a stator bridge assembly in which a plastic holder member is united to a magnetically permeable second stator member having a central hub and radiating pole pieces in spaced, overlapping relation to the hub and pole pieces of the first stator member. The plastic holder member includes thermoplastically worked portions which form a bushing in a central aperture in the hub of the second stator member to rotatably receive one end of the rotor axle while the other end of the rotor axle extends through an axially aligned central aperture in the hub of the first stator member. Other portions of the plastic holder member form a support bridge between the first and second stator members. Overlapping of extraneous areas of the first and second stator members not associated with the hub and pole pieces is eliminated to reduce magnetic losses in the stator circuit. The stator assembly thus provides a stable bridge for rotor pivoting with minimized magnetic losses, resulting in higher torque output at a given level of current.

4 Claims, 5 Drawing Figures

STATOR ASSEMBLY FOR STEPPING MOTOR

FIELD OF THE INVENTION

The present invention relates to an electric stepping motor and, more particularly, to a stepping motor with an improved stator assembly.

DESCRIPTION OF THE PRIOR ART

Small electric stepping motors are known which may be driven by periodic pulses produced by a transistorized driving circuit or other well-known equivalent circuits. Regardless of the method by which it is driven, the stepping motor generally includes a main magnetic circuit formed of a permanently magnetized rotor disposed in the air gap between spaced apart first and second stator members magnetically coupled to a coil. The excitation coil is magnetically coupled to the stator members usually by one or more magnetizable core members in the form of simple rectilinear or U-shaped steel or iron plates extending through the coil and contacting the stator members. Typical stepping motor constructions are illustrated in the Oudet et. al. U.S. Pat. No. 3,754,155 issued Aug. 21, 1973; the Schwarzschild U.S. Pat. No. 3,818,690 issued June 25, 1974; the Schwab et. al. U.S. Pat. No. 3,860,842 issued Jan. 14, 1975; the Kawabo et. al. U.S. Pat. No. 3,984,709 issued Oct. 5, 1976; the Kikuyama et. al. U.S. Pat. No. 3,989,967 issued Nov. 2, 1976 and the Oudet et. al. U.S. Pat. No. 4,079,279 issued Mar. 14, 1978.

One particular known stepping motor construction is shown in FIG. 1. The motor comprises a magnetically permeable (iron-nickel alloy) upper stator member 2 and lower stator member 4 with overlapping spoke-like pole pieces 2a and 4a and a rotor 6 in the form of a disc of hard magnetic material having a high coercive field, e.g., a rare earth alloy. The rotor is supported by a central axle 8 for rotation in the air gap between the upper and lower stator members. The central axle in turn is supported by plastic bushing 11 molded into a hole in the upper stator member and a lower bushing 12 in a frame 14. A wound coil 16 having leads 16a receives energizing current, for instance pulses of constant sign, and is coupled to the upper and lower stator members via L-shaped core members 18 having long portions 18a extending through the coil and short portions 18b extending transversely to contact the stator members. The aforementioned components of the stepping motor are stacked on support posts 14a of the frame and held in position by screws 21, e.g., as shown in FIG. 2. The motor is of the type described in U.S. Pat. No. 4,079,279 issued Mar. 28, 1978 to Oudet et. al. and further details of its operation are available in that patent.

SUMMARY OF THE INVENTION

It is an object of the present invention to increase the efficiency of a stepping motor of the type described above.

This and other objects and advantages are achieved in the present invention by providing a stable stator bridge for pivoting of the rotor therebetween with minimal magnetic losses.

Briefly, the stepping motor of the invention includes a magnetically permeable first stator member mounted on a frame member, the first stator member having a central hub, multiple spoke-like pole pieces radiating from the hub and central aperture in the hub through which one end of the rotor axle extends for rotation, preferably in a bushing located in the frame member. A stator bridge assembly is also mounted on the frame member and includes a plastic holder member united to a magnetically permeable second stator member having a central hub and multiple spoke-like pole pieces radiating from the hub in spaced, overlying relation to the hub and pole pieces of the first stator member to define a gap in which a rotor disc mounted on the central axle is disposed. The second stator member includes a central aperture in the hub axially aligned with the central aperture of the first stator member and portions of the plastic holder member are preferably thermoplastically worked to form a bushing in the aperture of the second stator member to rotatably receive the other end of the rotor axle. Other portions of the plastic holder member form a support bridge between the first and second stator members. The first and second stator members preferably each have an arm extending from at least one of the pole pieces for magnetic coupling to the excitation coil. The arms are arranged in non-overlapping relation so that they do not give rise to unwanted magnetic losses. Overlapping of other extraneous areas of the stator members (i.e., areas not associated with the hub or pole pieces) is eliminated to further reduce magnetic losses. A stable bridge for rotor pivoting with minimized magnetic losses is provided and results in significantly increased motor efficiency.

DESCRIPTION OF PREFERRED EMBODIMENTS

Figure 2:
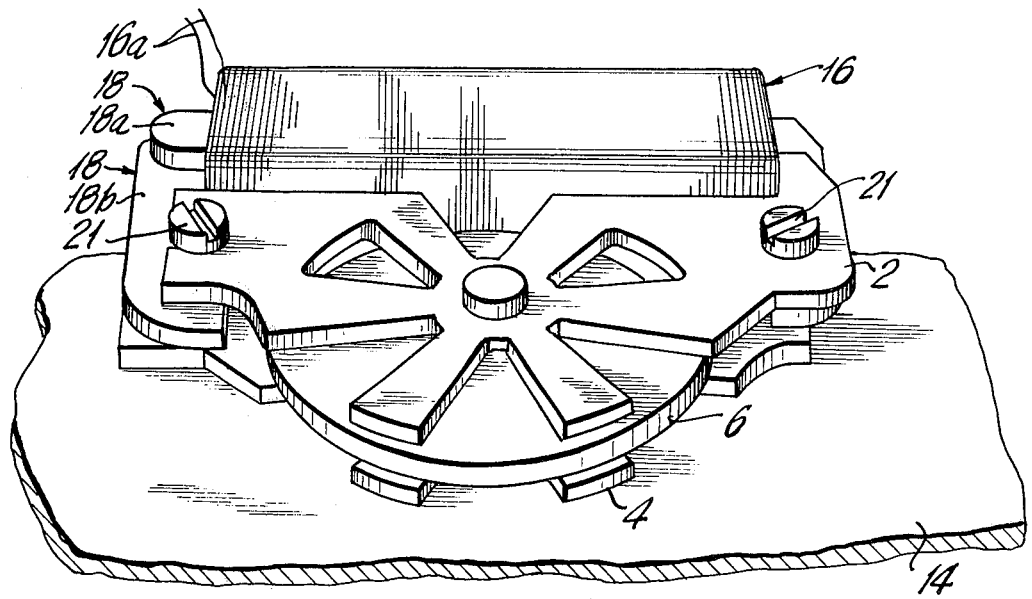
FIG. 2 is a perspective view of the assembled stepping motor of FIG. 1.
Figure 3:
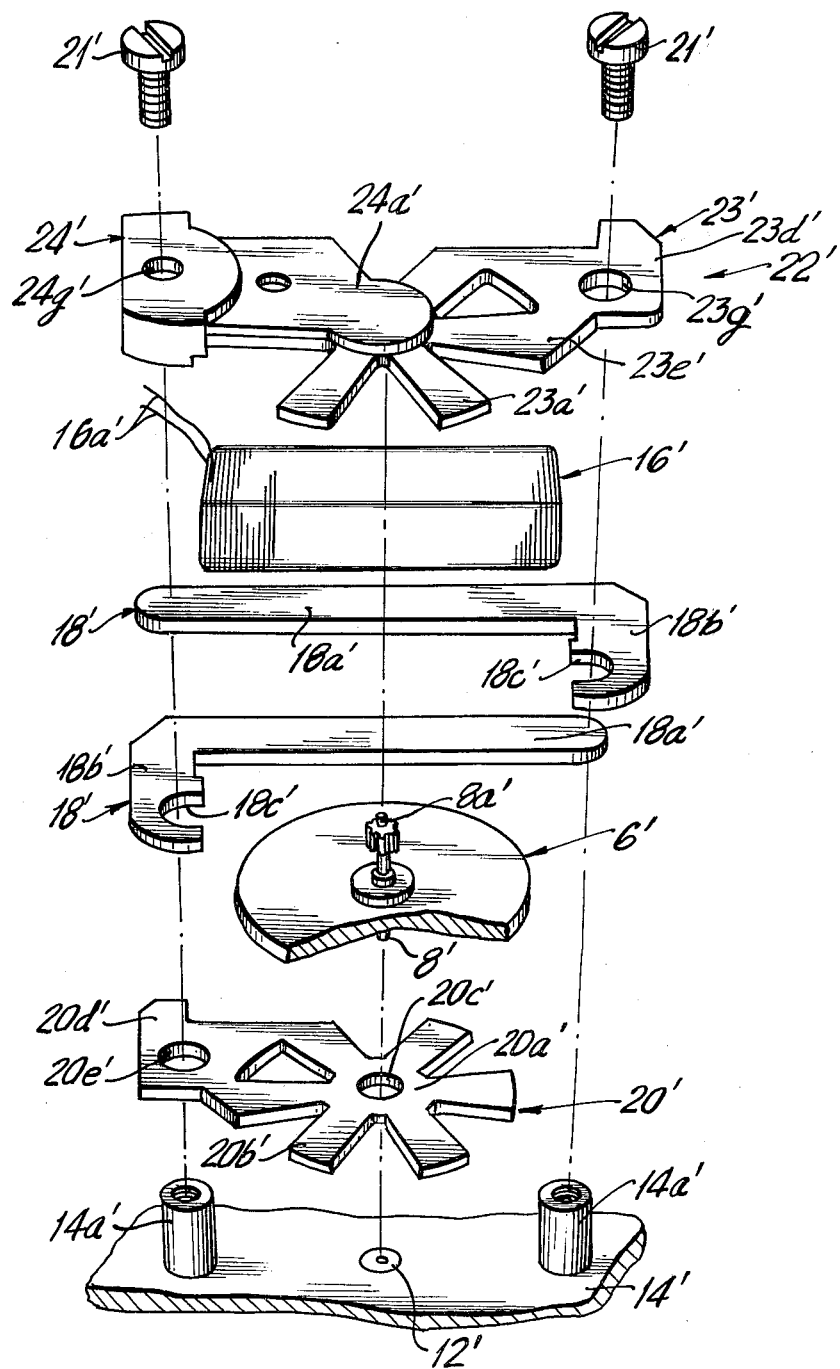
FIG. 3 is an exploded view of the stepping motor of the invention.

FIG. 3 shows the stepping motor of the invention having an improved stator assembly. It is apparent from the figure that many of the other motor components are similar to those of the stepping motor shown in FIGS. 1 and 2 and like components are designated by like numerals primed. Both stepping motors are preferably of the type illustrated in U.S. Pat. No. 4,079,279 issued Mar. 14, 1978 to Oudet et. al. which is incorporated herein by reference.

The stator assembly includes a magnetically permeable first stator member 20' having a central hub 20a', multiple, spoke-like pole pieces 20b' radiating from the hub and a central aperture 20c' in the hub. As shown, one end of the rotor shaft 8' passes through the central aperture 20c' and is received in axially aligned bushing 12' in the frame member 14'. It is apparent that two of the pole pieces on the left-hand side of the first stator member are extended to provide a ring motor arm 20d' projecting toward the coil 16' for contacting the short arm 18b' of the first core member 18'. The ring motor arm includes a hole 20e' through which support post 14a' passes. It is apparent that the other pole pieces of the first stator member 20' have not been extended to provide another ring motor arm on the right-hand side. This contrasts with the lower stator member 4 of FIG. 1, and is an important feature of the stator assembly of the invention as explained hereinbelow.

Figure 4:
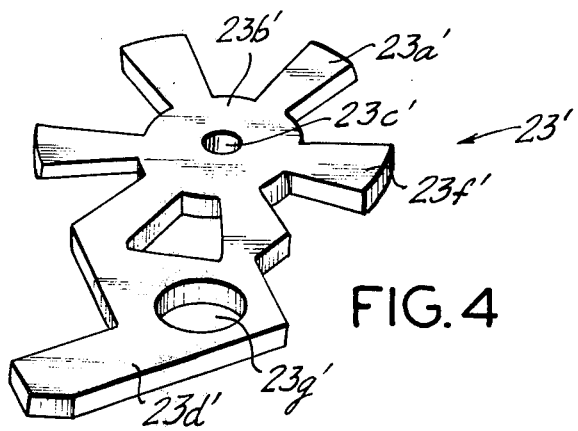
FIG. 4 is a perspective view of the second stator member of the stator bridge assembly of FIG. 3.
Figure 5:
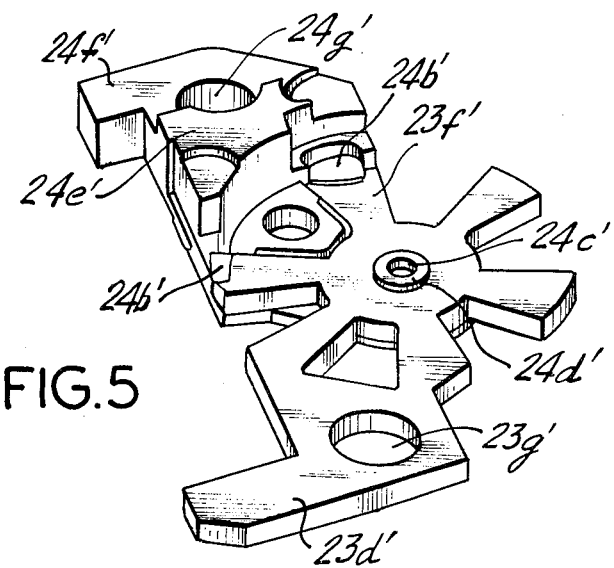
FIG. 5 is a perspective view of the stator bridge assembly showing the inner sides of the second stator member and plastic holder member.

Another important feature of the stator assembly is the provision of stator bridge 22' which comprises a magnetically permeable second stator member 23' similar in configuration to the first stator member; i.e., having spoke-like pole pieces 23a' radiating from a central hub 23b' and having a central aperture 23c' in the hub, FIGS. 4 and 5. It is apparent that two of the pole pieces on the right-hand side (relative to FIG. 3) of the second stator member have been extended to provide a ring motor arm 23d' to contact the short arm 18b' of the adjacent core member. The assembly further comprises a non-magnetically permeable plastic holder member 24' united to the second stator member 23' by thermoplastic working techniques, for example, warm forming, overmolding or ultrasonic welding. As shown in FIGS. 3 and 5, a projecting portion 24a' of the plastic holder member overlaps one (outer) side 23e' of the second stator member and multiple tabs 24b' are thermoplastically formed to engage the other (inner) side 23f' of the second stator member and thereby hold the components together. A bushing 24c' having a rim 24d' overlapping the inner side 23f' is also thermoplastically formed in the central aperture of the hub 23b' to rotatably receive end 8a' of the rotor axle 8'. The lip of the bushing also acts to hold the components together. The plastic holder member 24' is molded or otherwise formed to provide a support bridge 24e' of sufficient thickness in the axial direction to contact the first stator member 20' when the motor is assembled. The plastic holder member is also molded to provide a ring motor arm 24f' having a hole 24g' for receiving the fastening screw 21'.

Figure 1:
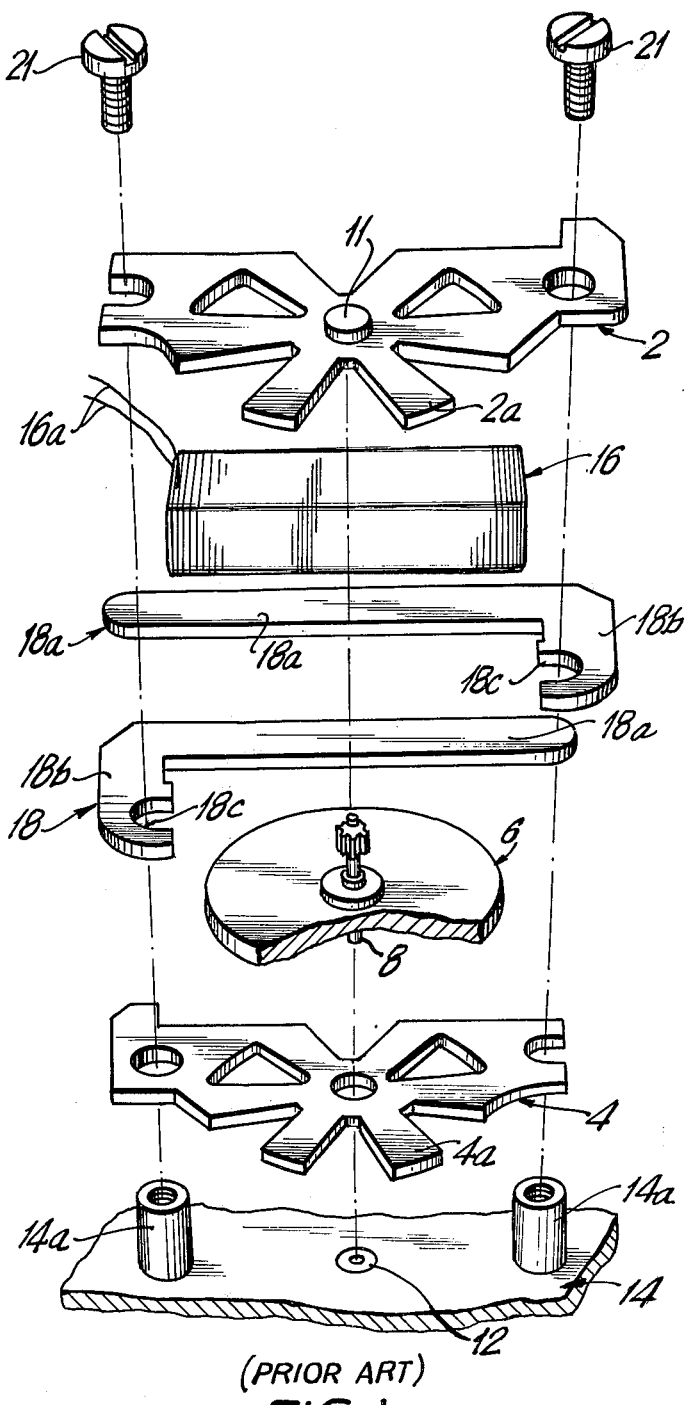
FIG. 1 is an exploded view of a known stepping motor construction.

It should be apparent that the stator bridge 22' in conjunction with the first stator member 20' eliminate magnetic losses experienced in the motor construction of FIGS. 1 and 2 because of extraneous magnetically permeable areas of the stator members; i.e., areas not associated with the hub and spoke-like pole pieces, overlapping one another. In the motor of the invention, the only overlapping areas of the stator members 20' and 23' are the central hubs and spoke-like pole pieces. The ring motor arms are not in overlapping relation and thus do not give rise to unwanted magnetic losses.

The stepping motor of the invention is mounted on a frame 14' by means of support posts 14a' and screws 21'. For example, the first stator member 20' is placed on the frame 14' with the support post extending through hole 20e' and with central aperture 20c' aligned with bushing 12'. Typically, the first stator member is glued to the frame 14'. The coil 16' with the core members 18' extending therethrough is stacked on the first stator member 20' with the slots 18c' receiving the posts 14a'. The stator bridge assembly 22' is placed over the arms of the core members with the hole 23g' in the second stator member receiving one support post 14a' and the hole 24g' in the platic holder member receiving the other support post. In this arrangement, the bushing 24c' of the stator bridge assembly is axially aligned with the central aperture 20c' of the first stator member and bushing 12' in the frame member 14', and the support bridge 24e' contacts the inner side of the first stator member to provide a stable mechanical bridge between the first and second stator members. Of course, the rotor disc 6' mounted on central axle 8' is located in the air gap between the first and second stator members, one end 8a' of the axle being received in the bushing 24c' of the stator bridge assembly and the other end in the bushing 12' in the frame member 14'.

As a result of the stator assembly used, magnetic losses in the stepping motor are minimized. This results in a significant increase in stepping motor efficiency, e.g., a stepping motor constructed in accordance with the invention will provide a 20% higher output torque at the same current level than a similar sized motor as that shown in FIGS. 1 and 2.

While the invention has been explained by a detailed description of preferred embodiments, it is understood that various modifications and substitutions can be made thereto within the scope of the appended claims which are intended to include equivalents of such embodiments.

I claim:

1. In a stepping motor of the type having first and second stator members in spaced apart, overlapping relation to define a gap therebetween in which a rotor disc is mounted on a central axle for rotation and having a coil magnetically coupled to the first and second stator members, the improvement comprising:

(a) a magnetically permeable first stator member having a central hub, multiple spoke-like first pole pieces radiating from the hub with at least one of said first pole pieces extending beyond said rotor disc in a first direction forming a first motor arm and a central aperture in the hub through which one end of the rotor axle extends for rotation;

(b) a stator bridge assembly comprising a magnetically permeable second stator member having a central hub and multiple spoke-like second pole pieces radiating from the hub in spaced, overlapping relation to the hub and pole pieces of the first stator member with at least one of said second pole pieces extending beyond said rotor disc forming a second motor arm in a second direction from said first motor arm for providing spaced, non-overlapping relation between said first motor arm and said second motor arm for substantially reducing magnetic losses and further comprising a non-magnetically permeable plastic holder member united to the second stator member, said second stator member having a central aperture in the hub axially aligned with the central aperture of the first stator member and said plastic holder member having portions forming a bushing in the central aperture of second stator member for receiving the other end of the rotor axle with remaining portions of the plastic holder member forming a support bridge between the first and second stator members; and (c) means for holding the stator bridge assembly and first stator member together.

2. The stepping motor of claim 1 wherein the plastic holder member includes thermoplastically worked portions forming said bushing in the central aperture of the second stator member and also forming connecting tabs to engage the second stator member and unite it to the holder member.

3. The stepping motor of claim 1 wherein the means for holding the stator bridge assembly and first stator member together comprises a frame member supporting the first stator member and having bushing means axially aligned with the central aperture of said first stator member to receive said one end of the rotor axle, and means for clamping the stator bridge assembly and first stator member against the frame member in stacked relation.

4. In a stepping motor of the type having first and second stator members in spaced apart, overlapping relation to define a gap therebetween in which a rotor disc is mounted on a central axle for rotation and having a coil magnetically coupled to the first and second stator members, the improvement comprising:
(a) a frame member having bushing means;
(b) a magnetically permeable first stator member disposed on the frame member and having a central hub, multiple spoke-like pole pieces radiating from the hub and a central aperture in the hub aligned with the bushing means and through which one end of the rotor axle extends for rotation in said bushing means, and further having an arm extending from at least one of said pole pieces for magnetic coupling to the coil;
(c) a stator bridge assembly comprising a magnetically permeable second stator member having a central hub and multiple spoke-like pole pieces radiating from the hub in spaced, overlapping relation to the hub and pole pieces of the first stator member and having an arm extending from at least one of said pole pieces in spaced, non-overlapping relation to the arm of said first stator member, and further comprising a non-magnetically permeable plastic holder member united to the second stator member, said second stator member having a central aperture in the hub axially aligned with the central aperture of the first stator member and said plastic holder member having thermoplastically worked portions forming a bushing in the central aperture of second stator member for receiving the other end of the rotor axle with remaining portions of the plastic holder member forming a support bridge between the first and second stator members; and
(d) means for holding the stator bridge assembly and first stator member together on the frame member.

* * * * *